US009942624B2

(12) United States Patent
Lovegreen

(10) Patent No.: US 9,942,624 B2
(45) Date of Patent: Apr. 10, 2018

(54) ON-PREMISES RESTAURANT COMMUNICATION SYSTEM AND METHOD

(75) Inventor: Kenneth J. Lovegreen, Lake Kiowa, TX (US)

(73) Assignee: Long Range Systems, LLC, Addison, TX (US)

( * ) Notice: Subject to any disclaimer, the term of this patent is extended or adjusted under 35 U.S.C. 154(b) by 644 days.

(21) Appl. No.: 12/931,828

(22) Filed: Feb. 11, 2011

(65) Prior Publication Data
US 2012/0206237 A1    Aug. 16, 2012

(51) Int. Cl.
| | | |
|---|---|---|
| *H04Q 9/00* | (2006.01) | |
| *G06Q 30/06* | (2012.01) | |
| *G06Q 50/12* | (2012.01) | |
| *G06Q 10/02* | (2012.01) | |

(52) U.S. Cl.
CPC .............. *H04Q 9/00* (2013.01); *G06Q 10/02* (2013.01); *G06Q 30/06* (2013.01); *G06Q 50/12* (2013.01); *H04Q 2209/47* (2013.01)

(58) Field of Classification Search
CPC ........ G06Q 30/06; G06Q 50/12; G06Q 10/02; H04Q 9/00; H04Q 2209/47
See application file for complete search history.

(56) References Cited

U.S. PATENT DOCUMENTS

| | | | | |
|---|---|---|---|---|
| 3,310,797 A | * | 3/1967 | Auger .................... | G08B 5/221 340/286.09 |
| 5,839,115 A | * | 11/1998 | Coleman .............. | G06Q 10/087 705/15 |
| 6,366,196 B1 | * | 4/2002 | Green ..................... | G06Q 50/12 340/10.6 |
| 6,561,428 B2 | * | 5/2003 | Meier et al. ............. | 235/462.25 |
| 6,580,360 B1 | * | 6/2003 | McKee .................. | G06Q 10/06 340/286.09 |
| 6,980,088 B2 | * | 12/2005 | Stambaugh ............... | E04H 3/04 340/286.09 |
| 7,817,990 B2 | * | 10/2010 | Pamminger et al. ...... | 455/414.3 |
| RE42,759 E | * | 9/2011 | Olewicz ........................... | 705/15 |
| 9,680,316 B2 | * | 6/2017 | Rakoczy ............... | H02J 7/0027 |
| 2002/0052790 A1 | * | 5/2002 | Tomishima ............ | G06Q 10/02 705/15 |
| 2003/0213840 A1 | * | 11/2003 | Livingston et al. .......... | 235/375 |
| 2004/0054592 A1 | * | 3/2004 | Hernblad ........................ | 705/15 |
| 2004/0158494 A1 | * | 8/2004 | Suthar .................... | G06Q 50/12 705/15 |

(Continued)

*Primary Examiner* — Daniel Walsh
(74) *Attorney, Agent, or Firm* — Kirby B. Drake; Klemchuk LLP

(57) ABSTRACT

An on-premises restaurant communication system for communicating a particular customer's table number to a food server at a central service station. Radio Frequency Identifier (RFID) tags are mounted on the underside of the restaurant's tables. The customer is provided with a pager having a pager ID associated with the customer's food order. The pager is modified to include an RFID reader and an RF transmitter. When the customer places the pager on a selected table, the RFID reader reads an RFID number from the table's RFID tag. The RF transmitter transmits the pager ID and RFID number to the central station, which uses this information to associate the food order with the table number. The table number is provided to the food server for delivery of the food order to the proper table.

9 Claims, 4 Drawing Sheets

(56) References Cited

U.S. PATENT DOCUMENTS

| | | | |
|---|---|---|---|
| 2004/0210621 A1* | 10/2004 | Antonellis | G06Q 10/087 709/200 |
| 2005/0011958 A1* | 1/2005 | Fukasawa et al. | 235/462.46 |
| 2005/0044179 A1* | 2/2005 | Hunter | 709/218 |
| 2005/0049940 A1* | 3/2005 | Tengler et al. | 705/27 |
| 2005/0059414 A1* | 3/2005 | Mahmoodi et al. | 455/456.2 |
| 2006/0085266 A1* | 4/2006 | Wei et al. | 705/15 |
| 2006/0109811 A1* | 5/2006 | Schotten | G01S 1/68 370/328 |
| 2006/0122896 A1* | 6/2006 | Parsley | G06Q 30/02 705/26.1 |
| 2006/0186197 A1* | 8/2006 | Rosenberg | G06Q 30/00 235/380 |
| 2007/0088620 A1* | 4/2007 | Tengler et al. | 705/26 |
| 2007/0088624 A1* | 4/2007 | Vaughn et al. | 705/26 |
| 2007/0205278 A1* | 9/2007 | Lovett | 235/383 |
| 2007/0251521 A1* | 11/2007 | Schackmuth | G06Q 10/087 126/369 |
| 2008/0116278 A1* | 5/2008 | Epshteyn | 235/462.25 |
| 2008/0237331 A1* | 10/2008 | Hammer | 235/375 |
| 2008/0288357 A1* | 11/2008 | Stambaugh | G06Q 10/06 705/15 |
| 2009/0192898 A1* | 7/2009 | Baril | G06Q 20/204 705/14.64 |
| 2009/0203367 A1* | 8/2009 | Pamminger et al. | 455/414.3 |
| 2010/0094715 A1* | 4/2010 | Kim et al. | 705/15 |
| 2010/0117806 A1* | 5/2010 | Hong | 340/10.4 |
| 2010/0312385 A1* | 12/2010 | Deuber | 700/245 |
| 2011/0153573 A1* | 6/2011 | Thomas | 707/687 |
| 2012/0206237 A1* | 8/2012 | Lovegreen | H04Q 9/00 340/10.1 |
| 2012/0236177 A1* | 9/2012 | Nishikawa | H04N 5/765 348/231.3 |
| 2014/0114807 A1* | 4/2014 | Baker | G06Q 30/016 705/26.41 |
| 2014/0244324 A1* | 8/2014 | Ford | G06Q 10/02 705/5 |
| 2015/0286917 A1* | 10/2015 | Rakoczy | G06Q 50/12 705/15 |
| 2015/0318731 A1* | 11/2015 | Rakoczy | H02J 7/0027 320/108 |
| 2016/0275631 A1* | 9/2016 | Serizawa | G06Q 50/12 |
| 2017/0256007 A1* | 9/2017 | Barman | G06Q 50/12 |
| 2017/0345043 A1* | 11/2017 | Mayo | G06Q 30/0226 |

* cited by examiner

ON-PREMISES RESTAURANT COMMUNICATION SYSTEM AND METHOD

BACKGROUND

Technical Field

This invention relates to on-premises paging and communication systems. More particularly, and not by way of limitation, the present invention is directed to an on-premises restaurant communication system and method that enables restaurant personnel to identify a customer's table number for delivery of a food order, or enables the restaurant personnel to page a customer waiting for a takeout order.

Description of Related Art

Many restaurants use a service method in which customers order their food at a central service counter, and then select their own table where they sit and wait for their food to be prepared. The customers may give their names to a server at the central counter, or the server may give each customer a number that will be called when the customer's food is ready. In either case, when the food is ready, a public address (PA) system is used to call out the name or number of the customer whose food is ready. The called customer then proceeds to the central counter and picks up his food. A disadvantage of the central service counter method is that many noisy PA system announcements must be made within the restaurant, thereby making the restaurant a less pleasant place to eat.

Some restaurants using the central service counter method eliminate the need to make noisy announcements by permanently mounting fixed paging receivers on tables throughout the restaurant and providing the customer with a data token that includes an encoded customer identifier. One such paging system is shown in U.S. Pat. No. 6,712,278 assigned to Long Range Systems, Inc. The customer inputs the token into the fixed paging receiver on the customer's selected table. When the customer's order is ready for pickup, a programmable paging transmitter broadcasts a paging message in the restaurant that includes the customer identifier. The fixed paging receiver mounted on the customer's table then generates an alert signal to alert the customer that his/her order is ready.

The fixed paging receivers, however, have the disadvantage that the restaurant staff must maintain and, if necessary, repair them. Batteries must be regularly replaced, and the permanently mounted paging receivers are susceptible to damage by customers.

In restaurants with sit-down service, customers often have to wait in a waiting area or lounge for a table to become available before they can sit down and order their food from a waiter. Some of these restaurants utilize an on-premises paging system to alert waiting customers when their table is available. When the customer first arrives at the restaurant, he is given an on-premises pager by the receptionist who then enters the code number of the pager into the on-premises paging system. When the customer's table is available, an on-premises paging transmitter pages the customer's pager with the proper code number, and the customer is alerted. When not in use, these pagers are stacked on a recharging base, thus eliminating the need for restaurant staff to change batteries.

In other restaurants having takeout operations, customers waiting for their food orders must remain in the area of the food service counter so that a restaurant staff member can notify them when their order is ready. This is normally done verbally.

SUMMARY OF THE INVENTION

It would be advantageous to have an on-premises communication system that effectively operates in multiple restaurant environments and in different service scenarios. The present invention is capable of notifying customers when a table is available for sit-down service or when a takeout food order is ready. The invention also informs restaurant staff members of a customer's table number when the restaurant uses a central service station and the customer has selected and sat at one of the restaurant's tables. The invention eliminates noisy announcements and solves the problems that permanently mounted fixed pagers experience with customer damage and the requirement to change batteries.

The present invention utilizes a mobile device such as an on-premises paging receiver modified to include additional functionality such as a radio frequency identifier (RFID) reader and an RF transmitter. The modified pager works in combination with RFID tags mounted on tables throughout the restaurant. One or more RFID tags may be mounted or taped on the underside of each table (or other inconspicuous location). All of the RFID tags mounted on a given table transmit the same RFID number, which corresponds to the table number. RFID tags mounted on different tables transmit different RFID numbers corresponding to the different table numbers. When a customer places an order at the central service station, the customer is given the on-premises pager programmed with a pager identifier (pager ID) associated with the customer's food order. The customer then selects a table and lays the pager in any location on the table. The RFID reader in the pager reads the RFID tag through the table, and the RF transmitter in the pager then transmits a signal to an RF receiver in the central service station or other location. The signal includes the RFID number and the pager ID. The central service station associates the customer's food order with the selected table and displays this information so that a waiter or food runner can then deliver the food order to the proper table.

In one embodiment, the present invention is directed to an on-premises communication system for use in a restaurant having a plurality of tables and a central service station. The system includes a plurality of RFID tags, each RFID tag having an RFID number and being attached to one of the plurality of tables in the restaurant, wherein each table is identified by a different RFID number. The system also includes a mobile device provided to a customer, the mobile device having a device identifier number associated with a food order for the customer. The mobile device includes an RFID reader for reading the RFID number from a given RFID tag when the customer places the mobile device on a given table to which the given RFID tag is attached; and a transmitter for transmitting a signal to the central service station, the signal including the device identifier number and the RFID number read from the given RFID tag. The central service station includes a receiver for receiving the signal from the mobile device; processor-controlled means for associating the received device identifier number with the food order for the customer; processor-controlled means for associating the received RFID number with the given table; processor-controlled means for associating the food order for the customer with the given table; and means for presenting to a restaurant staff member, an association between the food order for the customer and the given table for facilitating delivery of the food order to the given table.

In another embodiment, the present invention is directed to an on-premises pager for use in a restaurant having a plurality of tables and a central service station, the pager having a pager identifier associated with a food order for a customer. The pager includes an RFID reader for reading an RFID number from an RFID tag attached to one of the plurality of tables in the restaurant when the customer places the pager on the table to which the RFID tag is attached; a transmitter for transmitting a signal to the central service station, the signal including the pager identifier and the RFID number read from the RFID tag; a paging receiver for receiving a paging message from the central service station when the RFID reader does not read any RFID number; and an alerting mechanism for alerting the customer that the paging message has been received.

In another embodiment, the present invention is directed to a method of communicating a customer's table number to a food server in a restaurant having a plurality of tables and a central service station. The method includes the steps of attaching a plurality of RFID tags to the plurality of tables in the restaurant, each RFID tag having an RFID number, and each table being identified by a different RFID number; associating a device identifier number of a mobile device with a food order for the customer; and providing the mobile device to the customer, the mobile device including an RFID reader and a transmitter. The method also includes reading the RFID number from a given RFID tag with the RFID reader when the customer places the mobile device on a given table to which the given RFID tag is attached; transmitting a signal by the transmitter to the central service station, the signal including the device identifier number and the RFID number read from the given RFID tag; utilizing the device identifier number and the RFID number by the central service station to associate the food order with the given table number; and presenting the association of the food order with the given table number to a food server when the food order is ready.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention. The invention may be implemented in hardware or in a combination of hardware and software. For example, one or more computers or processors may perform the steps of the method of the present invention when executing computer program instructions stored in one or more program memories. Additionally, individual components of the invention may include their own processor and memory for controlling their functions.

The present invention provides an on-premises restaurant communication system and method that enables restaurant personnel to identify a customer's table number for delivery of an eat-in food order, or enables the restaurant personnel to page a customer who is waiting for a takeout food order, waiting for a table to become available, or is otherwise not associated with a table.

Figure 1:
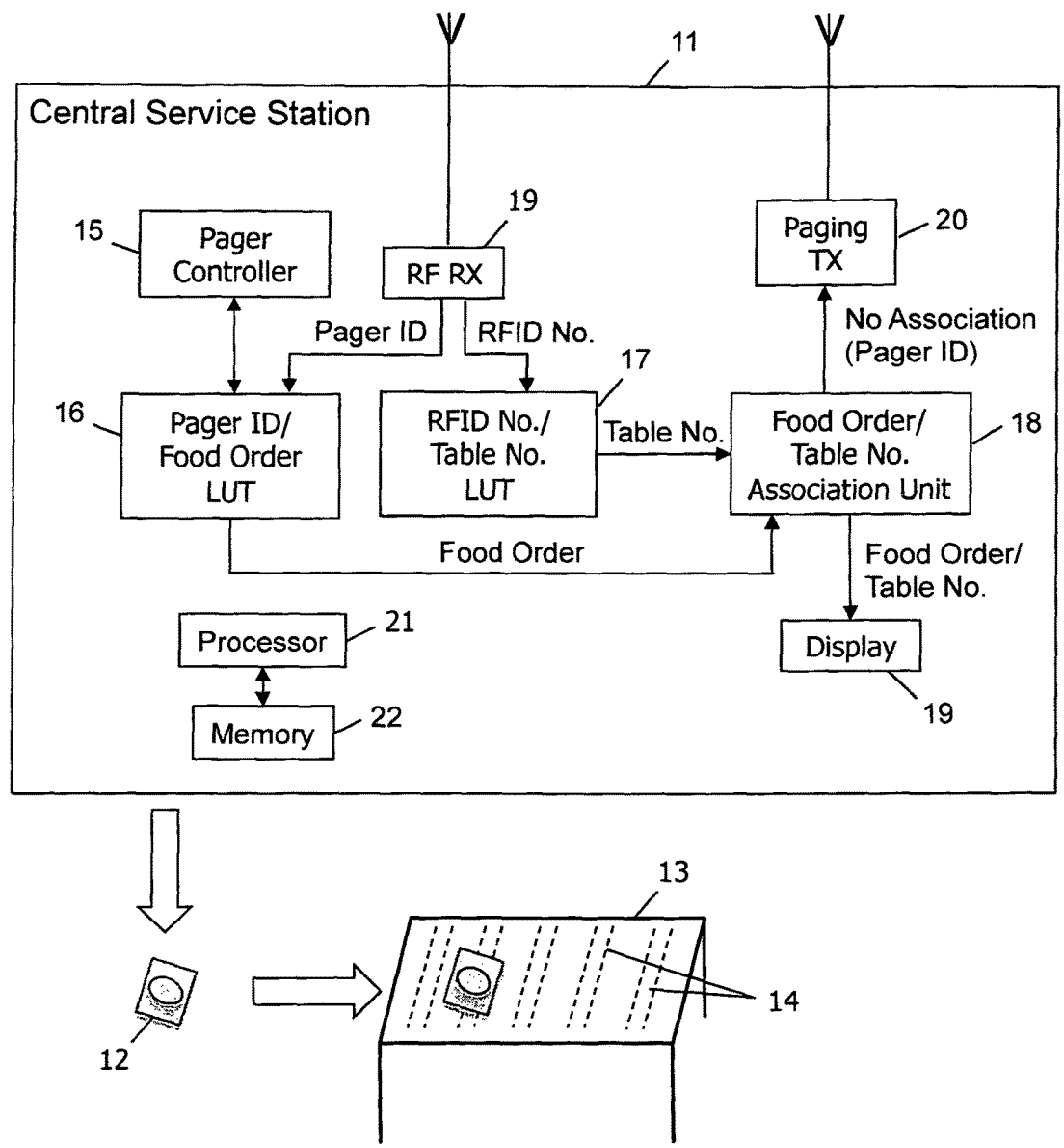
FIG. 1 is a simplified block diagram of an embodiment of the system of the present invention when implemented in a restaurant using a central service station.

FIG. 1 is a simplified block diagram of an embodiment of the system of the present invention when implemented in a restaurant using a central service station 11. The system includes the central service station 11, a modified on-premises pager 12, and a number of tables 13 (one shown) that have RFID tags 14 mounted or attached to them in one or more inconspicuous locations such as the underside of the table or along the side of the table. All of the RFID tags mounted on a given table transmit the same RFID number, which corresponds to the table number. RFID tags mounted on different tables transmit different RFID numbers corresponding to the different table numbers.

The central service station 11 includes a pager controller 15 through which a restaurant staff member assigns a food order number to one of the restaurant's modified on-premises pagers. The controller then stores this association in a pager ID/food order lookup table (LUT) 16. The central service station also includes an RFID No./Table No. LUT 17, a Food Order/Table No. Association Unit 18, and a display 19 or other device for presenting the food order and table number associations to the restaurant staff. When no association between the food order and a table number has been formed, an indication may be sent to a paging transmitter 20 to send a paging message to the pager. Operation of the central service station may be controlled by a processor or microprocessor 21 executing computer program instructions stored in a memory device 22.

Figure 2:
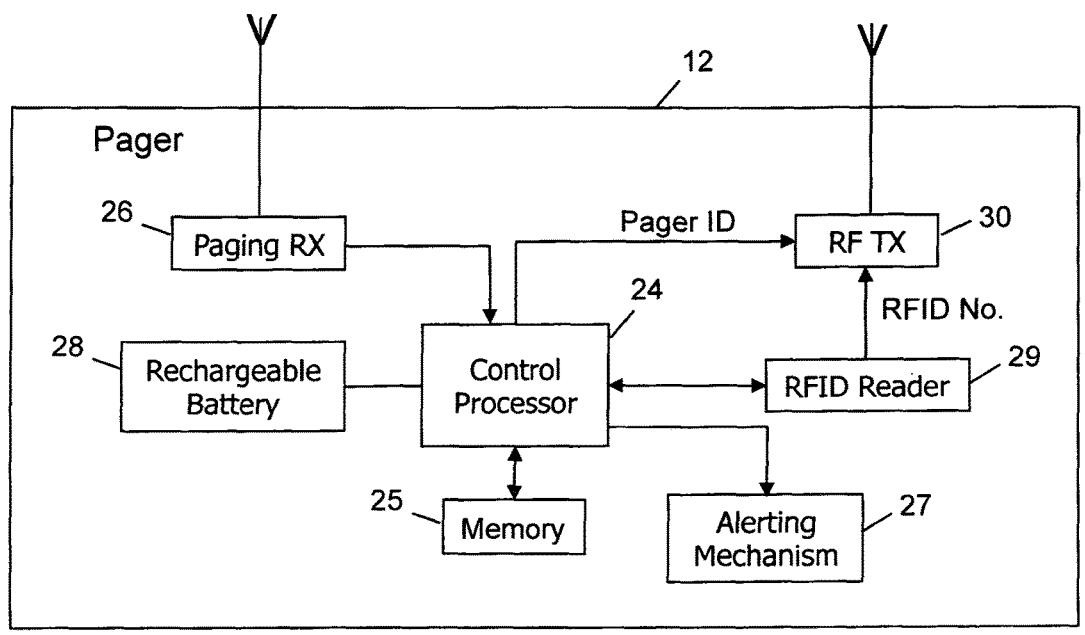
FIG. 2 is a simplified block diagram of an embodiment of the pager of the present invention.

FIG. 2 is a simplified block diagram of an embodiment of the pager 12 of the present invention. The pager includes the usual control processor 24, memory 25, paging receiver 26, alerting mechanism 27, and rechargeable battery 28. As shown in FIG. 2, the pager is modified in the present invention to include an RFID reader 29 and an RF transmitter 30.

Figure 3A:
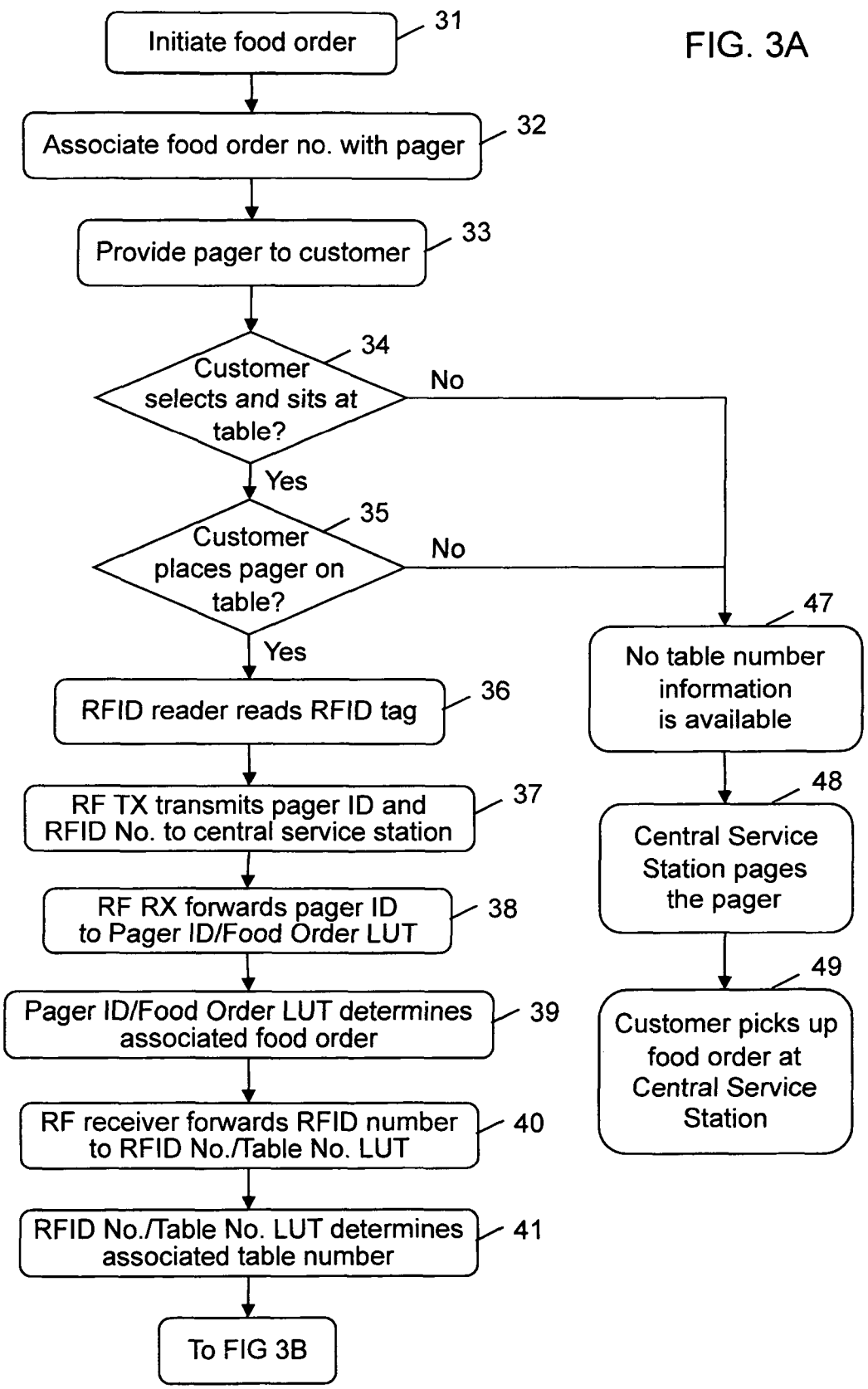
FIGS. 3A-3B are portions of a flow chart illustrating the steps of an exemplary embodiment of the method of the present invention.
Figure 3B:
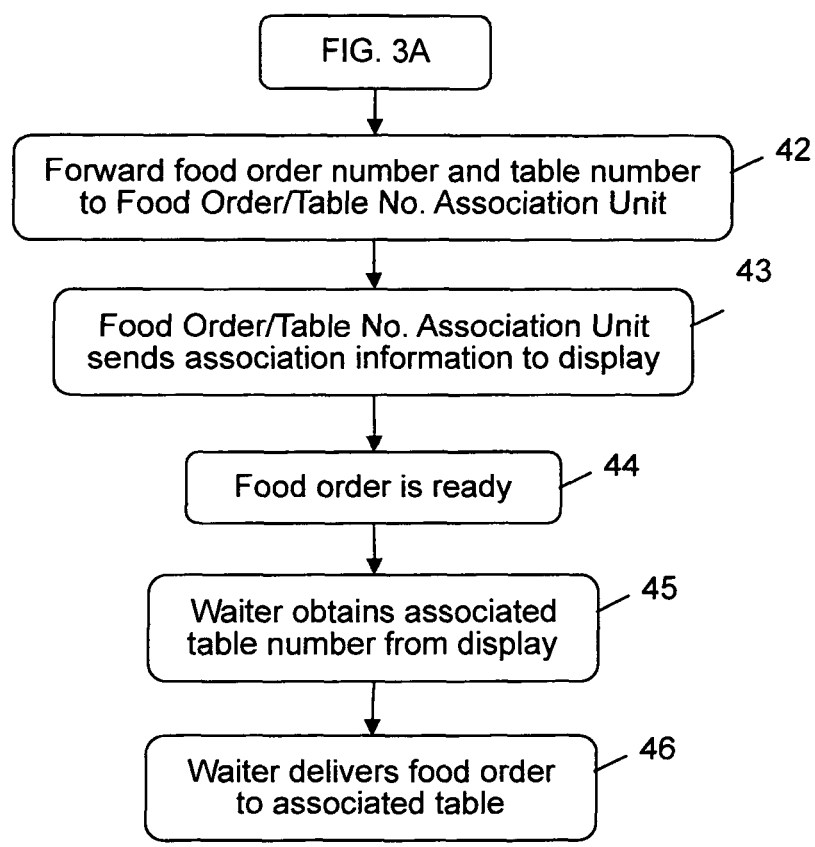

FIG. 3 is a flow chart illustrating the steps of an exemplary embodiment of the method of the present invention. At step 31, a food order is initiated at the central service station 11. At step 32, a food order number is associated with the pager 12. At step 33, the pager is provided to the customer. At step 34, the customer may or may not select a table 13 and sit down. In one scenario, the customer selects a table and sits down, and at step 35, may or may not place the pager on the table. In one scenario, the customer places the pager on the table at step 35, and the RFID reader 29 in the pager reads the RFID tag 14 through the table at step 36. At step 37, the RF transmitter 30 in the pager transmits a signal to the RF receiver 19 in the central service station 11 or other location. The signal includes the pager ID and the RFID number. At step 38, the RF receiver forwards the received pager ID to the Pager ID/Food Order LUT 16, which determines the associated food order at step 39. At step 40, the RF receiver forwards the RFID number to the RFID No./Table No. LUT 17, which determines the associated table number at step 41. The method then moves to FIG. 3B.

Referring to FIG. 3B, at step 42, the food order and table number are forwarded to the Food Order/Table No. Association Unit 18, which associates the two and sends the association information to a device such as the display 19 at step 43. At step 44, the food order is ready, and the waiter or food runner checks the display at step 45 to obtain the associated table number where the customer is seated. At step 46, the waiter or food runner delivers the food order to the proper table where the customer is seated.

Referring again to FIG. 3A steps 34 and 35, there are a number of scenarios in which the customer does not select and sit at a table or place the modified pager on a table before the customer's food order is ready. For example, after the pager is provided to the customer at step 33, the customer may stop to talk to friends long enough for the food order to be ready. In this case, the waiter or food runner will note at step 47 that there is no table number information available for the customer's food order. In this case, the waiter or food runner instructs the system at step 48 to page the customer's pager, indicating that the customer's food order is ready. At step 49, the customer returns to the central service station to pick up his food order.

Customers who are waiting for takeout orders will also not have table numbers associated with their food orders. Therefore, when a takeout order is ready, the system pages the customer, who then comes to the central service station to pick up the takeout order. In this scenario, the takeout customer is no longer required to stay in the vicinity of the central service station, but may roam throughout the restaurant or wait in the lounge.

The pager 12 may also include one or more buttons for the customer to press when service is needed. When the button is pressed, the RF transmitter 30 in the pager transmits a service request indication to the central service station 11 together with the RFID number read from the table's RFID tag. The RFID No./Table No. LUT 17 associates the RFID number with the table number and displays a message that the customer at Table No. 8, for example, is requesting service.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. An on-premises communication system for use in a restaurant having a plurality of tables and a central service station, the system comprising:
    a plurality of radio frequency identifier (RFID) tags, each RFID tag having an RFID number and being attached to one of the plurality of tables in the restaurant, wherein each table is identified by a different RFID number;
    a mobile device provided to a customer, the mobile device having a device identifier number associated with a food order for the customer, the mobile device comprising:
    an RFID reader for reading the RFID number from a given RFID tag when the customer places the mobile device on a given table to which the given RFID tag is attached in a first mode of operation of the system, wherein the first mode includes the RFID reader provided to read the RFID number for delivery of the food order in the restaurant; and
    a transmitter for transmitting a signal to the central service station, the signal including the device identifier number and the RFID number read from the given RFID tag,
    wherein, by a processor, the central service station is configured to automatically present to a restaurant staff member on a central service station display an association between the food order for the customer and the one of the plurality of tables selected by the customer for facilitating delivery of the food order to the table in the first mode of operation of the system, and
    wherein the central service station includes:
        a receiver for receiving the signal from the mobile device;
        a pager controller provided to assign and store a first relationship between the mobile device and the food order, a second relationship between the RFID number and the table number, and a third relationship between the food order and the table number in at least one lookup table; and
        processor-controlled means for associating the received device identifier number with the food order for the customer;
    processor-controlled means for associating the received RFID number with the given table in the first mode of operation of the system;
    processor-controlled means for associating the food order for the customer with the given table in the first mode of operation of the system; and
    a paging transmitter adapted to allow transmission of a paging message to the mobile device in a second mode of operation of the system when the RFID reader does not read any RFID number;
        wherein the second mode includes the RFID reader which fails to read the RFID number in which the customer is paged,
        wherein a paging receiver is configured to receive a paging message from the central service station when the RFID reader fails to read the RFID number in the second mode,
        wherein the paging transmitter is configured to page the customer when the food order is ready for pick up in the second mode of operation, and
        wherein the paging transmitter is configured to page the customer when no association between the food order and the given table is formed in the second mode of operation.

2. The on-premises communication system according to claim 1, wherein the mobile device also includes the paging receiver and means for alerting the customer when a paging message is received from the paging transmitter;
    wherein when the food order for the customer is ready and no association between the food order and one of the tables is presented to the restaurant staff member, the paging transmitter sends the paging message to the mobile device.

3. The on-premises communication system according to claim 2, wherein the mobile device includes processor-controlled circuitry powered by an internal rechargeable battery, and the system further comprises:
    a plurality of mobile devices for providing to a plurality of customers; and
    a battery charger for simultaneously recharging the batteries of the plurality of mobile devices.

4. The on-premises communication system according to claim 1, wherein the mobile device also includes:
    a button for the customer to input a request for service; and means for generating a request message in response to detecting that the customer pressed the button, the request message including the RFID number read from the table's RFID tag;
wherein the transmitter transmits the request message to the central service station.

5. An on-premises pager for use in a restaurant having a plurality of tables and a central service station, the pager having a pager identifier associated with a food order for a customer, the pager comprising:
a radio frequency identifier (RFID) reader for reading an RFID number from an RFID tag attached to one of the plurality of tables in the restaurant when the customer places the pager on the table to which the RFID tag is attached in a first mode of operation of the pager;
a transmitter for transmitting a signal to the central service station, the signal including the pager identifier and the RFID number read from the RFID tag in the first mode of operation of the pager, wherein the first mode includes reading the RFID number from the RFID tag for delivery of the food order in the restaurant;
a pager controller provided to assign and store a first relationship between the mobile device and the food order, a second relationship between the RFID number and the table number, and a third relationship between the food order and the table number in at least one lookup table;
a paging receiver for:
receiving a paging message from the central service station when the RFID reader does not read any RFID number in a second mode of operation of the pager, wherein the second mode includes failing to read the RFID number in which the customer is paged;
wherein the transmitter is configured to page the customer when the food order is ready for pick up in the second mode of operation of the pager, and
wherein the transmitter is configured to page the customer when no association between the food order and a table number is formed in the second mode of operation of the pager;
wherein, by a processor, the central service station is configured to automatically present the paging message to a restaurant staff member on a central service station display; and
an alerting mechanism for alerting the customer that the paging message has been received.

6. The on-premises pager according to claim 5, further comprising: processor-controlled circuitry powered by an internal rechargeable battery; and means for connecting the pager to a battery charger for recharging the battery.

7. The on-premises pager according to claim 5, further comprising:
a button for the customer to input a request for service; and
means for generating a request message in response to detecting that the customer pressed the button, the request message including the RFID number read from the table's RFID tag;
wherein the transmitter transmits the request message to the central service station.

8. A method of communicating in a restaurant having a plurality of tables and a central service station, the method comprising the steps of:
attaching a plurality of radio frequency identifier (RFID) tags to the plurality of tables in the restaurant, each RFID tag having an RFID number, and each table being identified by a different RFID number;
associating a device identifier number of a mobile device with a food order for the customer;
providing the mobile device to the customer, the mobile device including an RFID reader and a transmitter;
reading the RFID number from a given RFID tag with the RFID reader when the customer places the mobile device on a given table to which the given RFID tag is attached in a first mode of operation of the method, wherein the first mode includes reading the RFID number from the given RFID tag for delivery of the food order in the restaurant;
transmitting a signal by the transmitter to the central service station, the signal including the device identifier number and the RFID number read from the given RFID tag in the first mode of operation of the method;
storing, by utilizing a pager controller, a first relationship between the mobile device and the food order, a second relationship between the RFID number and the table number, and a third relationship between the food order and the table number in at least one lookup table;
utilizing the device identifier number and the RFID number by the central service station to associate the food order with the given table number in the first mode of operation of the method;
by a processor, automatically presenting the association of the food order with the given table number to a restaurant staff member on a central service station display when the food order is ready in the first mode of operation of the method; and
allowing restaurant personnel to page the customer in a second mode of operation of the method when the RFID reader does not read any RFID number, wherein the second mode includes failing to read the RFID number and paging the customer;
wherein the transmitter is configured to page the customer when the food order is ready for pick up in the second mode of operation of the method, and
wherein the transmitter is configured to page the customer when no association between the food order and the given table number is formed in the second mode of operation of the method.

9. The method according to claim 8, wherein the step of utilizing the device identifier number and the RFID number by the central service station to associate the food order with the given table number includes the steps of:
associating the received device identifier number with the food order number for the customer utilizing a first lookup table;
associating the received RFID number with a table number for the given table utilizing a second lookup table; and
providing the food order number and the table number to an associating unit that associates the food order for the customer with the given table.

* * * * *